(12) United States Patent
Martin (10) Patent No.: US 12,543,635 B2
(45) Date of Patent: Feb. 10, 2026

(54) ONE HAND CONTROLLER FOR ZERO TURN MOWERS

(71) Applicant: Daniel Richard Martin, Carencro, LA (US)

(72) Inventor: Daniel Richard Martin, Carencro, LA (US)

(*) Notice: Subject to any disclaimer, the term of this patent is extended or adjusted under 35 U.S.C. 154(b) by 336 days.

(21) Appl. No.: 18/484,015

(22) Filed: Oct. 10, 2023

(65) Prior Publication Data

US 2024/0334866 A1  Oct. 10, 2024

Related U.S. Application Data

(60) Provisional application No. 63/577,193, filed on Apr. 7, 2023.

(51) Int. Cl.
*A01D 34/00* (2006.01)
*A01D 34/82* (2006.01)
*G05G 1/04* (2006.01)
*A01D 101/00* (2006.01)

(52) U.S. Cl.
CPC ......... *A01D 34/006* (2013.01); *A01D 34/824* (2013.01); *G05G 1/04* (2013.01); *A01D 2101/00* (2013.01)

(58) Field of Classification Search
CPC ............................ A01D 34/006; A01D 34/824
USPC ........................................................ 180/333
See application file for complete search history.

(56) References Cited

U.S. PATENT DOCUMENTS

| 4,708,357 | A | * | 11/1987 | Soderbaum | ............ | B62B 5/067 |
| | | | | | | 74/551.8 |
| 4,872,697 | A | * | 10/1989 | Berkowitz | ............ | B62B 5/067 |
| | | | | | | 280/304.5 |
| 5,644,903 | A | | 7/1997 | Davis, Jr. | | |
| 7,426,976 | B2 | * | 9/2008 | Edlin | ............ | A01D 34/64 |
| | | | | | | 280/778 |

(Continued)

FOREIGN PATENT DOCUMENTS

| EP | 3807116 B1 | 3/2022 |
| EP | 4056018 A1 | 9/2022 |

OTHER PUBLICATIONS

Joystick Steering—Country Clipper Highlights, retrieved from the internet retrieved on Oct. 10, 2023; <URL: https://www.countryclipper.com/videos/#single/0>.

(Continued)

*Primary Examiner* — Christopher D Hutchens (57) ABSTRACT

A one hand controller for zero turn mowers includes a left steering controller and a right steering controller. The left steering controller mounts to a left steering lever of the mower and includes an angle plate, a linear track, and at least one left-steering-lever fastener. The right steering controller mounts to a right steering lever of the mower and includes a plate body, handle, a latch, and a right-steering-lever fastener. The linear track traverses along a top plate of the angle plate. The left-steering-lever fastener is connected to a bottom plate of the angle plate. The latch is connected to the plate body. The right-steering-lever fastener is rotatably mounted to the plate body. The handle is mounted to the plate body and oppositely positioned to the latch and the right-steering-lever fastener. The latch is slidably engaged within the linear track thus allowing the handle to operate the mower.

20 Claims, 5 Drawing Sheets

(56) References Cited

U.S. PATENT DOCUMENTS

| | | | |
|---|---|---|---|
| 11,285,986 B1* | 3/2022 | Scott | A01D 34/824 |
| 12,365,381 B1* | 7/2025 | Crowe | A01D 34/82 |
| 2008/0178568 A1* | 7/2008 | Edlin | A01D 34/64 |
| | | | 56/10.8 |
| 2019/0239431 A1* | 8/2019 | Kastelic, Jr. | B62D 11/006 |

OTHER PUBLICATIONS

Ryobi 80V Joystick Riding Mowers, retrieved from the internet, retrieved on Oct. 10, 2023, <URL:https://opereviews.com/ryobi-80v-joystick-riding-mowers/>.

* cited by examiner

ONE HAND CONTROLLER FOR ZERO TURN MOWERS

The current application claims a priority to the U.S. provisional patent application Ser. No. 63/577,193 filed on Apr. 7, 2023.

FIELD OF THE INVENTION

The present invention relates generally to zero turn mower accessories. More specifically, the present invention is a one hand controller for zero turn mowers so that the operator can control both the left steering lever and the right steering lever of the zero turn mowers with only one hand.

BACKGROUND OF THE INVENTION

The present invention relates generally to zero turn mower accessories. More specifically, the present invention is a one hand controller for zero turn mowers so that the operator can control both the left steering lever and the right steering lever of the zero turn mowers with only one hand. A zero-turn riding lawn mower is a standard riding lawn mower with a turning radius that is effectively zero when the two drive wheels rotate in opposite direction. Most zero-turn mowers today, steering is simply changing the speeds of the drive tires, a method called differential steering. The tire speed is controlled by two steering levers that protrude on either side of the driver and typically extend over the lap (also known as lap bars). When both steering levers are pushed forward simultaneously with the same force, the mower moves forward; when both steering levers are pulled back simultaneously with the same force, the mower moves backward. Push one lever more than the other and the mower makes a gentle turn. Push one lever forward and pull the other back and the mower pivots from the drive wheels, creating a zero-radius turn. As mentioned above, the operator has to use both the left hand and the right hand to fully control the zero turn mower. This can be problematic when the user has to move tree branches or any other obstacles and consume beverages during the mowing process as both hands are occupied with the left steering lever and the right steering lever.

It is therefore an objective of the present invention to provide a one hand controller for zero turn mowers so that the operator can effectively operate the zero turn mower with only one hand. More specifically, the present invention functions as an interconnecting operating device between the left steering lever and the right steering lever thus releasing the brakes of the zero turn mower. Then, the operator can use either the left hand or the right hand to control the present invention. Resultantly, the present invention is able to effectively move the zero turn mower in the forward direction, the reverse direction, the left turning direction, and the right turning direction.

DETAIL DESCRIPTIONS OF THE INVENTION

All illustrations of the drawings are for the purpose of describing selected versions of the present invention and are not intended to limit the scope of the present invention.

The present invention is a one hand controller for zero turn mowers so that the operator can effectively operate the zero turn mower with only one hand. The present invention functions as an interconnecting operating device between the left steering lever of the zero turn mower and the right steering lever of the zero turn mower and allows the operator to fully control the zero turn mower. In other words, Once the present invention is installed within the zero turn mower, the present invention releases the brakes and moves the zero turn mower in any desired direction as the present invention can be operated with only one hand.

Figure 1:
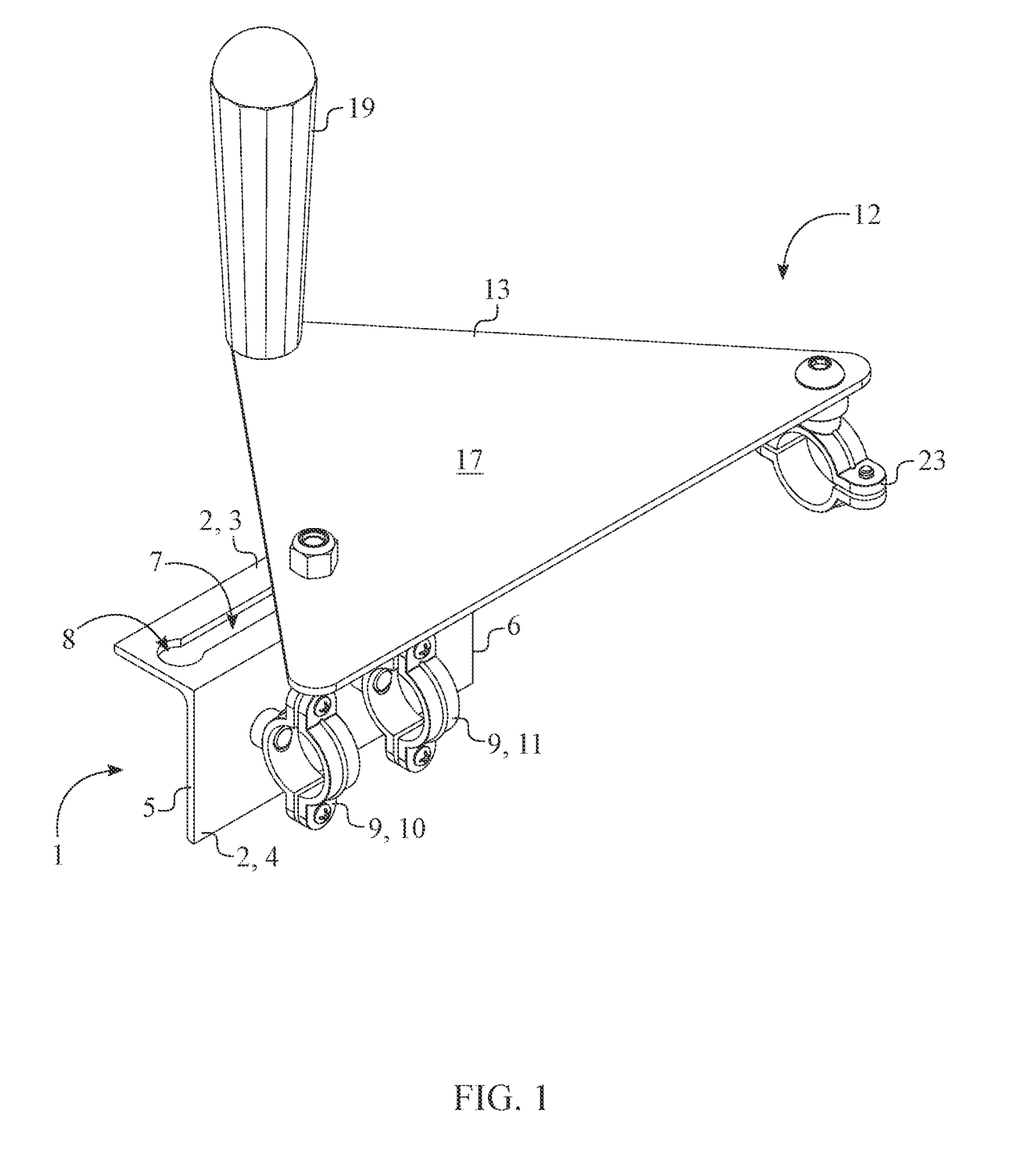
FIG. 1 is a top perspective view of the present invention.
Figure 2:
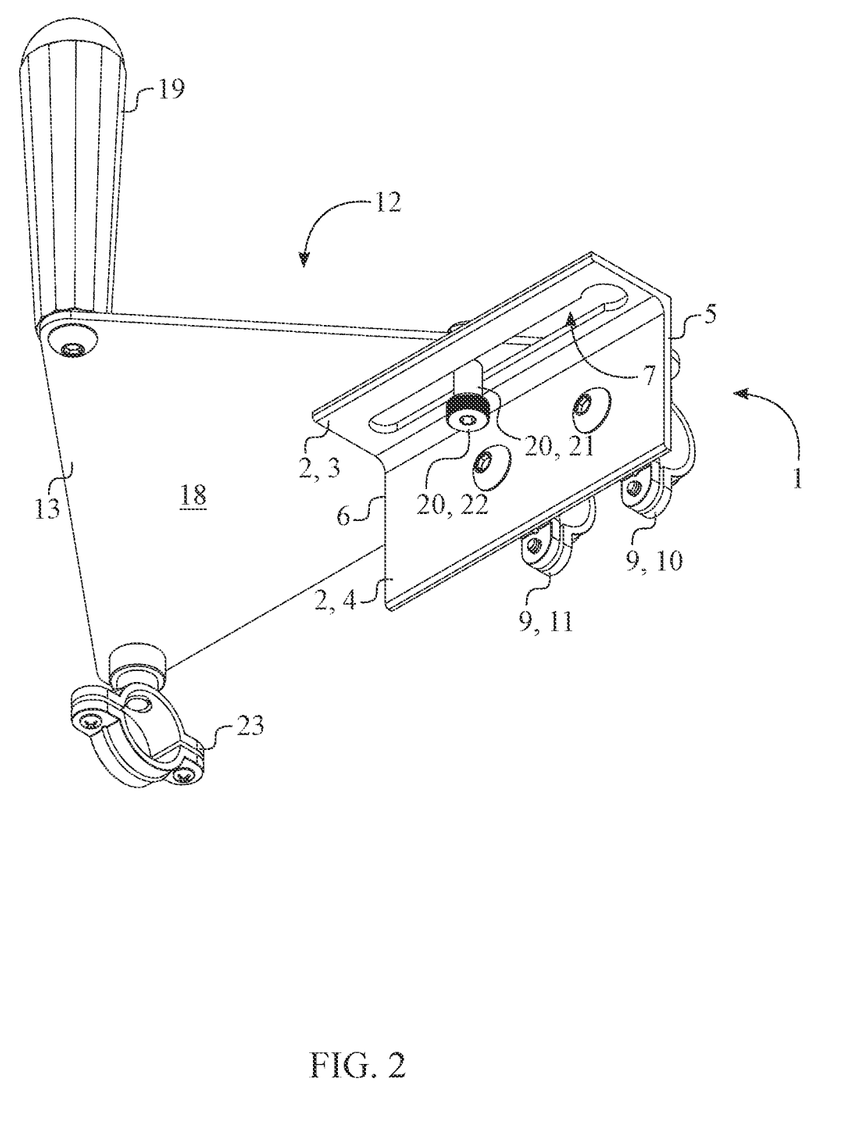
FIG. 2 is a bottom perspective view of the present invention.

In reference to the general configuration, the present invention comprises a left steering controller 1 and a right steering controller 12. In order to operate the zero turn mower, the left steering controller 1 is attached to the left steering lever of the zero turn mower, and the right steering controller 12 is attached to the right steering lever of the zero turn mower. As shown in FIG. 1 and FIG. 2, the left steering controller 1 comprises an angle plate 2, a linear track 7, and at least one left-steering-lever fastener 9. More specifically, the angle plate 2 functions as the base structure so that the linear track 7 can traverse along a top plate 3 of the angle plate 2, and the at least one left-steering-lever fastener 9 is able to connect to a bottom plate 4 of the angle plate 2. As shown in FIG. 1 and FIG. 2, the right steering controller 12 comprises a plate body 13, handle 19, a latch 20, and at least one right-steering-lever fastener 23. More specifically, the plate body 13 functions as the base structure so that the latch 20 can be connected to the plate body 13, and the right-steering-lever fastener 23 can be rotatably mounted to the plate body 13. The handle 19 is mounted to the plate body 13 and oppositely positioned to the latch 20 and the right-steering-lever fastener 23 about the plate body 13. Resultantly, the angle plate 2 and the plate body 13 are mounted adjacent to each other as the exact positioning of the angle plate 2 and the plate body 13 is decided upon the positioning of the left steering lever and the right steering lever. Once the operator sits on the zero turn mower, the operator can bring both the left steering lever and the right steering lever over the operator's lap so that the left steering controller 1 and the right steering controller 12 can be operatively engaged with each other. In other words, the latch 20 is slidably engaged within the linear track 7 in such a way that the at least one left-steering-lever fastener 9 is axially positioned to the right-steering-lever fastener 23. The operator is then able to grasp the handle 19 with one hand, wherein the handle 19 enables the zero turn mower to be moved in any desired direction.

The left steering controller 1 is attached to the left steering lever of the zero turn mower so that the directional movement of the handle 19 can be transferred into the left steering lever. In reference to FIGS. 1-3, the angle plate 2 is an L-shaped rigid body and may further comprise an outside edge 5 and an inside edge 6. More specifically, the top plate 3 is terminally connected to the bottom plate 4 in such a way that the top plate 3 is perpendicularly positioned to the bottom plate 4. The top plate 3 and the bottom plate 4 are extended from the outside edge 5 to the inside edge 6 thus delineating the general configuration of the angle plate 2.

Figure 3:
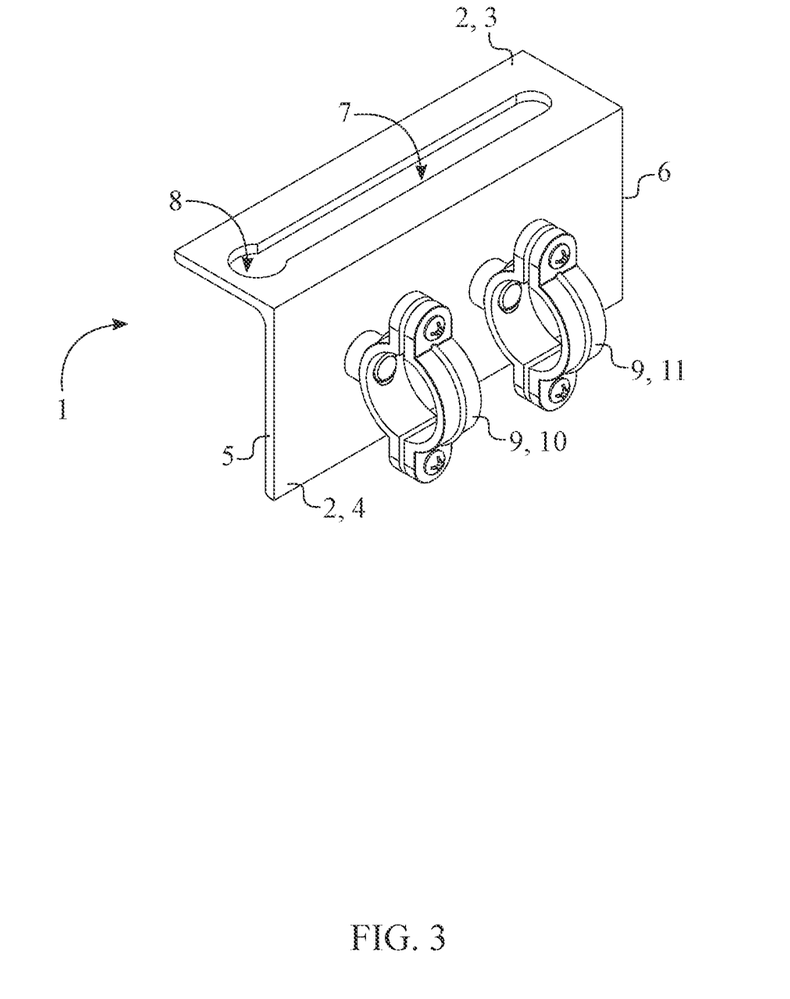
FIG. 3 is a top perspective view of the left steering controller of the present invention.

The linear track 7 is positioned in between the outside edge 5 and the inside edge 6 and formed into a stadium-shape so that the latch 20 is able to slide along the length of the linear track 7. The at least one left-steering-lever fastener 9 is positioned in between the outside edge 5 and connected to the bottom plate 4. Furthermore, the at least one left-steering-lever fastener 9 and the top plate 3 are oriented opposite of each other so that the movement of the latch 20 does not interfere with the at least one left-steering-lever fastener 9. For example, when the left steering controller 1 is attached to the left steering lever, the bottom plate 4 is positioned adjacent to the left steering lever and in front of the left steering lever as the top plate 3 is oriented towards the front end of the zero turn mower.

In reference to FIG. 1 and FIG. 3, the present invention may further comprise a latch-receiving opening 8 so that the latch 20 can be easily inserted into the linear track 7 or removed from the linear track 7. More specifically, the latch-receiving opening 8 traversing through the top plate 3 and centrally positioned to the linear track 7 as the diameter of the latch-receiving opening 8 is greater than the diameter of the linear track 7. In other words, the latch-receiving opening 8 provides a bigger hole in comparison to the linear track 7 so that the latch 20 can be inserted into the linear track 7 or removed from the linear track 7 via the latch-receiving opening 8. In order to attain the maximum side-to-side movement of the latch 20, the latch-receiving opening 8 is positioned adjacent to the outside edge 5 of the angle plate 2.

In reference to FIG. 1 and FIG. 3, the at least one left-steering-lever fastener 9 may comprise a first fastener 10 and a second fastener 11 so that the angle plate 2 can be firmly secured to the left steering lever. More specifically, the first fastener 10 is concentrically positioned to the second fastener 11 and externally positioned to the bottom plate 4. The first fastener 10 is positioned adjacent to the outside edge 5 of the angle plate 2. The second fastener 11 is positioned adjacent to the inside edge 6 of the angle plate 2. As a result, the first fastener 10 and the second fastener 11 provide two attachments between the bottom plate 4 and the left steering lever. The present invention preferably uses clamp fasteners as the first fastener 10 and the second fastener 11; however, the present invention can use any other types of industry standard fasteners that can be quickly and easily attached or detached to mount the angle plate 2 to the left steering lever.

The right steering controller 12 is attached to the right steering lever of the zero turn mower so that the directional movement of the handle 19 can be transferred into the right steering lever. In reference to FIG. 4 and FIG. 5, the plate body 13 is preferably formed into a triangular shape and may comprise a first edge 14, a second edge 15, a third edge 16, a top surface 17, and a bottom surface 18. More specifically, the first edge 14 is angularly positioned to the second edge 15 thus delineating a front corner of the plate body 13. The first edge 14 is angularly positioned to the third edge 16 thus delineating an inside corner of the plate body 13. The second edge 15 is angularly positioned to the third edge 16 thus delineating an outside corner of the plate body 13. The top surface 17 is positioned parallel to the bottom surface 18, wherein the top surface 17 and the bottom surface 18 are perimetrically positioned about the first edge 14, the second edge 15, and the third edge 16.

Figure 4:
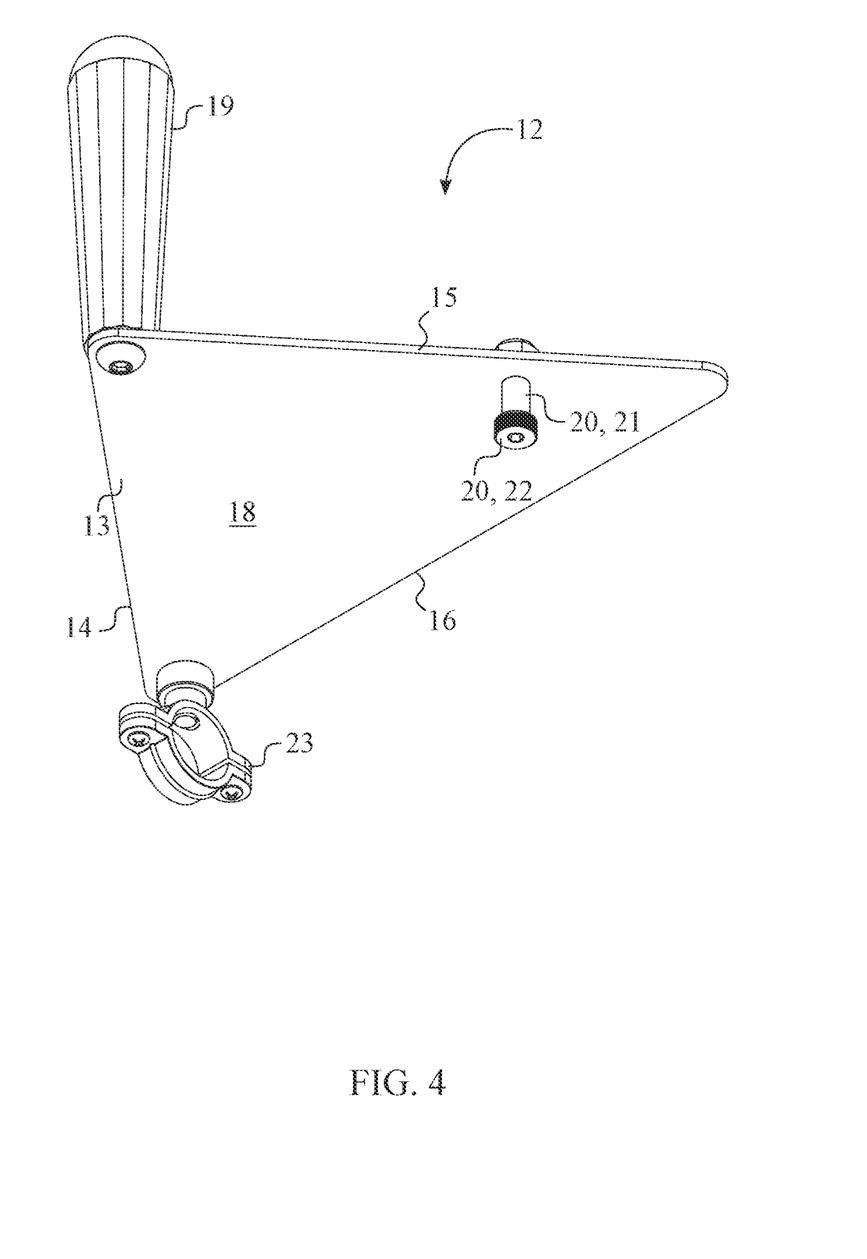
FIG. 4 is a bottom perspective view of the right steering controller of the present invention.
Figure 5:
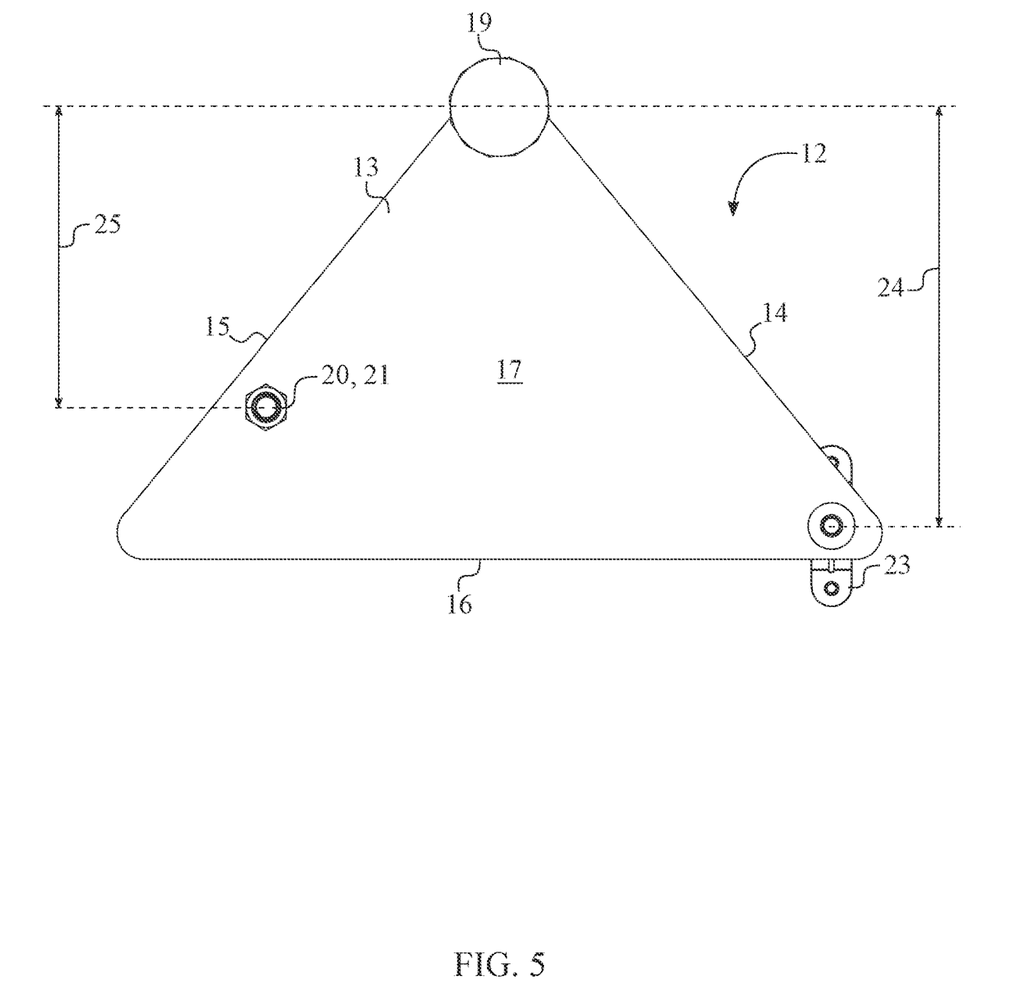
FIG. 5 is a top view of the right steering controller of the present invention.

As shown in FIG. 4 and FIG. 5, the positioning of the latch 20, the right-steering-lever fastener 23, and the handle 19 delineate a triangular configuration so that the movements of the handle 19 are able to directly control the movements of the zero turn mower. More specifically, the latch 20 is connected to the bottom surface 18 and positioned adjacent to the second edge 15 and the third edge 16. The right-steering-lever fastener 23 is rotatably mounted to the bottom surface 18 and positioned adjacent to the first edge 14 and the third edge 16. The handle 19 is mounted to the top surface 17 and positioned adjacent to the first edge 14 and the second edge 15. In other words, the latch 20 is positioned adjacent to the outside corner of the plate body 13 so that the plate body 13 is able to slidably engaged with the angle plate 2 via the engagement between the latch 20 and the linear track 7. The right-steering-lever fastener 23 is positioned adjacent to the inside corner of the plate body 13 thus allowing the right-steering-lever fastener 23 to function as a fixed attachment point about the right steering lever. Due to the rotatable attachment between the right-steering-lever fastener 23 and the plate body 13, the plate body 13 is then able to rotate about the right-steering-lever fastener 23. Even though the preferred embodiment of the present invention only uses a single fastener for the right-steering-lever fastener 23, the present invention can use multiple fasteners for the right-steering-lever fastener 23 without deviating from the scope of the functionality. The handle 19 is positioned adjacent to the front corner of the plate body 13 so that the operator can easily grasp and control the handle 19. For example, when the handle 19 is pushed forward, the plate body 13 moves forward and forces the left steering lever and the right steering lever to simultaneously move forward thus resulting in the forward movement of the zero turn mower. When the handle 19 is pulled backward, the plate body 13 moves backward and forces the left steering lever and the right steering lever to simultaneously move backward thus resulting in the backward movement of the zero turn mower.

In order to make a left turn of the zero turn mower, the operator has to move the handle 19 towards the left steering lever so that the right steering lever can be pushed forward with the rotation of the plate body 13. To make a right turn of the zero turn mower, the operator has to move the handle 19 towards the right steering lever so that the left steering lever can be pushed forward with the rotation of the plate body 13. As shown in FIG. 2, the latch 20 and the right-steering-lever fastener 23 are positioned offset of each other so that the plate body 13 is able to smoothly rotate about a rotational axis of the right-steering-lever fastener 23. In reference to FIG. 5, the present invention may further comprise a first distance 24 and a second distance 25 so that the offset positioning of the latch 20 and the right-steering-lever fastener 23 can be defined. More specifically, the first distance 24 is delineated from the handle 19 to the right-steering-lever fastener 23 in such a way that the first distance 24 is linearly oriented perpendicular to the third edge 16. The second distance 25 is delineated from the handle 19 to the latch 20 in such a way that the second distance 25 is linearly oriented perpendicular to the third edge 16. The first distance 24 is greater than the second distance 25, wherein the offset positioning of the latch 20 and the right-steering-lever fastener 23 enables the present invention to turn the zero turn mower left or right. For example, when the handle 19 is moved to the left side (toward the left steering lever), the plate body 13 rotates about the right-steering-lever fastener 23 and pushes the inside corner of the plate body 13 forward as the latch 20 slidably moves toward the outside edge 5 of the angle plate 2. Then, the present invention is able to push forward only the right steering lever thus allowing the zero turn mower to make a left turn. When the handle 19 is moved to the right side (toward the right steering lever), the plate body 13 rotates about the right-steering-lever fastener 23 and pushes the outside corner of the plate body 13 forward as the latch 20 slidably moves toward the inside edge 6 of the angle plate 2. Then, the present invention is able to push forward only the left steering lever thus allowing the zero turn mower to make a right turn.

As shown in FIG. 2 and FIG. 4, the latch 20 is a cylindrical body and may comprise a shaft 21 and a head 22 so that the latch 20 can be inserted in the linear track 7, removed from the linear track 7, and moved within the linear track 7. More specifically, the shaft 21 is terminally connected to the plate body 13 and outwardly oriented from the bottom surface 18. The head 22 is concentrically and terminally connected to the shaft 21 and positioned offset from the plate body 13. Furthermore, a diameter of the head 22 is greater than a diameter of the shaft 21 so that the latch 20 does not accidentally dislodge from the linear track 7. In order to engage the right steering controller 12 and the left steering controller 1 together, the right steering controller 12 is positioned atop the left steering controller 1 in such a way that the top plate 3 is positioned adjacent to the bottom surface 18 of the plate body 13. Then, the head 22 can be inserted through the latch-receiving opening 8 thus allowing the shaft 21 to be slidably positioned within the linear track 7. Resultantly, the head 22 is positioned adjacent to the bottom plate 4 as the top plate 3 is positioned in between the plate body 13 and the head 22. In order to disengage the right steering controller 12 and the left steering controller 1 from each other, the head 22 is concentrically aligned with the latch-receiving opening 8 so that latch 20 can be separated from the linear track 7 via the latch-receiving opening 8.

Although the invention has been explained in relation to its preferred embodiment, it is to be understood that many other possible modifications and variations can be made without departing from the spirit and scope of the invention as hereinafter claimed.

What is claimed is:

1. A one hand controller for zero turn mowers comprising:
a left steering controller;
a right steering controller;
the left steering controller comprising an angle plate, a linear track, and at least one left-steering-lever fastener;
the right steering controller comprising a plate body, handle, a latch, and at least one right-steering-lever fastener;
the linear track traversing along a top plate of the angle plate;
the at least one left-steering-lever fastener being connected to a bottom plate of the angle plate;
the latch being connected to the plate body;
the right-steering-lever fastener being rotatably mounted to the plate body;
the handle being mounted to the plate body;
the handle being oppositely positioned to the latch and the right-steering-lever fastener about the plate body;
the angle plate and the plate body being mounted adjacent to each other;
the at least one left-steering-lever fastener being axially positioned to the right-steering-lever fastener; and
the latch being slidably engaged within the linear track.

2. The one hand controller for zero turn mowers as claimed in claim 1 comprising:
the angle plate further comprising an outside edge and an inside edge;
the top plate being terminally connected to the bottom plate;
the top plate being perpendicularly positioned to the bottom plate;
the top plate and the bottom plate being extended from the outside edge to the inside edge;
the linear track being positioned in between the outside edge and the inside edge; and
the at least one left-steering-lever fastener being positioned in between the outside edge and the inside edge.

3. The one hand controller for zero turn mowers as claimed in claim 1 comprising:
a latch-receiving opening;
the latch-receiving opening traversing through the top plate;
the latch-receiving opening being centrally positioned to the linear track; and
the latch-receiving opening being positioned adjacent to an outside edge of the angle plate.

4. The one hand controller for zero turn mowers as claimed in claim 1 comprising:
the at least one left-steering-lever fastener comprising a first fastener and a second fastener;
the first fastener being concentrically positioned to the second fastener;
the first fastener being positioned adjacent to an outside edge of the angle plate; and
the second fastener being positioned adjacent to an inside edge of the angle plate.

5. The one hand controller for zero turn mowers as claimed in claim 1 comprising:
the plate body comprising a first edge, a second edge, a third edge, a top surface, and a bottom surface;
the first edge being angularly positioned to the second edge;
the first edge being angularly positioned to the third edge;
the second edge being angularly positioned to the third edge;
the top surface being positioned parallel to the bottom surface; and
the top surface and the bottom surface being perimetrically positioned about the first edge, the second edge, and the third edge.

6. The one hand controller for zero turn mowers as claimed in claim 1 comprising:
the plate body comprising a first edge, a second edge, a third edge, a top surface, and a bottom surface;
the latch being connected to the bottom surface;
the latch being positioned adjacent to the second edge and the third edge;
the right-steering-lever fastener being rotatably mounted to the bottom surface;
the right-steering-lever fastener being positioned adjacent to the first edge and the third edge;
the handle being mounted to the top surface; and
the handle being positioned adjacent to the first edge and the second edge.

7. The one hand controller for zero turn mowers as claimed in claim 6 comprising:
a first distance;
a second distance;
the first distance being delineated from the handle to the right-steering-lever fastener;
the second distance being delineated from the handle to the latch;
the first distance being linearly oriented perpendicular to the third edge;
the second distance being linearly oriented perpendicular to the third edge; and
the first distance being greater than the second distance.

8. The one hand controller for zero turn mowers as claimed in claim 1 comprising:
the latch comprising a shaft and a head;
the shaft being terminally connected to the plate body;
the head being concentrically and terminally connected to the shaft;
the head being positioned offset from the plate body;
the top plate being positioned adjacent to a bottom surface of the plate body;
the shaft being slidably positioned within the linear track;
the head being positioned adjacent to the bottom plate; and
the top plate being positioned in between the plate body and the head.

9. A one hand controller for zero turn mowers comprising:
a left steering controller;
a right steering controller;
a latch-receiving opening;
the left steering controller comprising an angle plate, a linear track, and at least one left-steering-lever fastener;
the right steering controller comprising a plate body, handle, a latch, and at least one right-steering-lever fastener;
the linear track traversing along a top plate of the angle plate;
the latch-receiving opening traversing through the top plate;
the latch-receiving opening being centrally positioned to the linear track;
the at least one left-steering-lever fastener being connected to a bottom plate of the angle plate;
the latch being connected to the plate body;
the right-steering-lever fastener being rotatably mounted to the plate body;
the handle being mounted to the plate body;
the handle being oppositely positioned to the latch and the right-steering-lever fastener about the plate body;
the angle plate and the plate body being mounted adjacent to each other;
the at least one left-steering-lever fastener being axially positioned to the right-steering-lever fastener; and
the latch being slidably engaged within the linear track.

10. The one hand controller for zero turn mowers as claimed in claim 9 comprising:
the angle plate further comprising an outside edge and an inside edge;
the top plate being terminally connected to the bottom plate;
the top plate being perpendicularly positioned to the bottom plate;
the top plate and the bottom plate being extended from the outside edge to the inside edge;
the linear track being positioned in between the outside edge and the inside edge;
the latch-receiving opening being positioned adjacent to an outside edge of the angle plate; and
the at least one left-steering-lever fastener being positioned in between the outside edge and the inside edge.

11. The one hand controller for zero turn mowers as claimed in claim 9 comprising:
the at least one left-steering-lever fastener comprising a first fastener and a second fastener;
the first fastener being concentrically positioned to the second fastener;
the first fastener being positioned adjacent to an outside edge of the angle plate; and
the second fastener being positioned adjacent to an inside edge of the angle plate.

12. The one hand controller for zero turn mowers as claimed in claim 9 comprising:
the plate body comprising a first edge, a second edge, a third edge, a top surface, and a bottom surface;
the first edge being angularly positioned to the second edge;
the first edge being angularly positioned to the third edge;
the second edge being angularly positioned to the third edge;
the top surface being positioned parallel to the bottom surface; and
the top surface and the bottom surface being perimetrically positioned about the first edge, the second edge, and the third edge.

13. The one hand controller for zero turn mowers as claimed in claim 9 comprising:
the plate body comprising a first edge, a second edge, a third edge, a top surface, and a bottom surface;
the latch being connected to the bottom surface;
the latch being positioned adjacent to the second edge and the third edge;
the right-steering-lever fastener being rotatably mounted to the bottom surface;
the right-steering-lever fastener being positioned adjacent to the first edge and the third edge;
the handle being mounted to the top surface; and
the handle being positioned adjacent to the first edge and the second edge.

14. The one hand controller for zero turn mowers as claimed in claim 13 comprising:
a first distance;
a second distance;
the first distance being delineated from the handle to the right-steering-lever fastener;
the second distance being delineated from the handle to the latch;
the first distance being linearly oriented perpendicular to the third edge;
the second distance being linearly oriented perpendicular to the third edge; and
the first distance being greater than the second distance.

15. The one hand controller for zero turn mowers as claimed in claim 9 comprising:
the latch comprising a shaft and a head;
the shaft being terminally connected to the plate body;
the head being concentrically and terminally connected to the shaft;
the head being positioned offset from the plate body;
the top plate being positioned adjacent to a bottom surface of the plate body;
the shaft being slidably positioned within the linear track;
the head being positioned adjacent to the bottom plate; and
the top plate being positioned in between the plate body and the head.

16. A one hand controller for zero turn mowers comprising:
a left steering controller;
a right steering controller;
a latch-receiving opening;
the left steering controller comprising an angle plate, a linear track, and at least one left-steering-lever fastener;
the right steering controller comprising a plate body, handle, a latch, and at least one right-steering-lever fastener;

the plate body comprising a first edge, a second edge, a third edge, a top surface, and a bottom surface;

the linear track traversing along a top plate of the angle plate;

the latch-receiving opening traversing through the top plate;

the latch-receiving opening being centrally positioned to the linear track;

the at least one left-steering-lever fastener being connected to a bottom plate of the angle plate;

the first edge being angularly positioned to the second edge;

the first edge being angularly positioned to the third edge;

the second edge being angularly positioned to the third edge;

the top surface being positioned parallel to the bottom surface;

the top surface and the bottom surface being perimetrically positioned about the first edge, the second edge, and the third edge;

the latch being connected to the plate body;

the right-steering-lever fastener being rotatably mounted to the plate body;

the handle being mounted to the plate body;

the handle being oppositely positioned to the latch and the right-steering-lever fastener about the plate body;

the angle plate and the plate body being mounted adjacent to each other;

the at least one left-steering-lever fastener being axially positioned to the right-steering-lever fastener; and the latch being slidably engaged within the linear track.

17. The one hand controller for zero turn mowers as claimed in claim 16 comprising:

the angle plate further comprising an outside edge and an inside edge;

the top plate being terminally connected to the bottom plate;

the top plate being perpendicularly positioned to the bottom plate;

the top plate and the bottom plate being extended from the outside edge to the inside edge;

the linear track being positioned in between the outside edge and the inside edge;

the latch-receiving opening being positioned adjacent to an outside edge of the angle plate; and the at least one left-steering-lever fastener being positioned in between the outside edge and the inside edge.

18. The one hand controller for zero turn mowers as claimed in claim 16 comprising:

the at least one left-steering-lever fastener comprising a first fastener and a second fastener;

the first fastener being concentrically positioned to the second fastener;

the first fastener being positioned adjacent to an outside edge of the angle plate; and the second fastener being positioned adjacent to an inside edge of the angle plate.

19. The one hand controller for zero turn mowers as claimed in claim 16 comprising:

a first distance;

a second distance;

the latch being connected to the bottom surface;

the latch being positioned adjacent to the second edge and the third edge;

the right-steering-lever fastener being rotatably mounted to the bottom surface;

the right-steering-lever fastener being positioned adjacent to the first edge and the third edge;

the handle being mounted to the top surface;

the handle being positioned adjacent to the first edge and the second edge;

the first distance being delineated from the handle to the right-steering-lever fastener;

the second distance being delineated from the handle to the latch;

the first distance being linearly oriented perpendicular to the third edge;

the second distance being linearly oriented perpendicular to the third edge; and the first distance being greater than the second distance.

20. The one hand controller for zero turn mowers as claimed in claim 16 comprising:

the latch comprising a shaft and a head;

the shaft being terminally connected to the plate body;

the head being concentrically and terminally connected to the shaft;

the head being positioned offset from the plate body;

the top plate being positioned adjacent to a bottom surface of the plate body;

the shaft being slidably positioned within the linear track;

the head being positioned adjacent to the bottom plate; and the top plate being positioned in between the plate body and the head.

* * * * *